United States Patent [19]

Honda et al.

[11] Patent Number: 4,794,885
[45] Date of Patent: Jan. 3, 1989

[54] INTAKE APPARATUS FOR INTERNAL COMBUSTION ENGINE

[75] Inventors: Yasuo Honda; Takenori Ohtsuka, both of Hiroshima; Tomohiro Sunada, Higashihiroshima; Yasuhiro Kawasako, Hiroshima, all of Japan

[73] Assignee: Mazda Motor Corporation, Hiroshima, Japan

[21] Appl. No.: 86,810

[22] Filed: Aug. 19, 1987

[30] Foreign Application Priority Data

Sep. 10, 1986 [JP] Japan .................................. 61-211477

[51] Int. Cl.[4] ......................... F02B 75/18; F02M 35/10
[52] U.S. Cl. ............................... 123/52 M; 123/52 MC
[58] Field of Search ......... 123/52 M, 52 MB, 52 MV, 123/52 MC

[56] References Cited

U.S. PATENT DOCUMENTS

| 3,814,069 | 6/1974 | Croft et al. | 123/52 M |
| 4,304,211 | 12/1981 | Tezuka et al. | 123/585 |
| 4,643,136 | 2/1987 | Ura et al. | 123/52 M |
| 4,649,871 | 3/1987 | Hatamura et al. | 123/52 MV |
| 4,690,106 | 9/1987 | Nakayama et al. | 123/52 M |

FOREIGN PATENT DOCUMENTS 60-171955 11/1985 Japan .

Primary Examiner—Willis R. Wolfe
Assistant Examiner—M. Macy
Attorney, Agent, or Firm—Fleit, Jacobson, Cohn & Price

[57] ABSTRACT

An intake apparatus for an in-line type internal combustion engine having an elongated surge tank extending the full extension of the in-line cylinders of the engine. Intake passages connect the surge tank with the in-line engine cylinders. A throttle body is secured to one side surface of the surge tank. The registering and connected surfaces of the surge tank and the throttle body are mutually inclined an angle $\theta$ with respect to the medial plane or axes of the in-line cylinders.

11 Claims, 4 Drawing Sheets

INTAKE APPARATUS FOR INTERNAL COMBUSTION ENGINE

BACKGROUND OF THE INVENTION

1. Field of the Invention

The present invention relates to an intake apparatus for an internal combustion engine and, more particularly, to an intake apparatus for an in-line internal combustion engine having a surge tank mounted with a throttle body. The invention relates specifically to air in-line ICE, that is, one in which the cylinders are arrayed in a common straight line as opposed to a V-type ICE where the cylinders are arrayed in two rows with the medial axial planes of the cylinders forming a Vee.

2. Description of the Prior Art

A conventional in-line internal combustion engine has a surge tank mounted with a throttle body secured to one side of the surge tank in its intake passage. For example, Japanese Unexamined Utility Model Publication No. 60(1985)-171955 discloses such an intake apparatus. The surge tank and throttle body are connected at common registering surfaces. However, the common registering connecting surfaces of the surge tank and throttle body lie in a plane parallel to a vertical plane passing through the longitudinal axes of the in-line cylinders accommodated in the engine body. Such an arrangement for an in-line engine is inherently unable to satisfy a demand for increased vibration durability. An intake apparatus having a throttle body as described is generally apt to vibrate during the engine operation due to the heavy weight of the throttle body. The vibration occurs mainly in a vertical plane parallel to the axes of cylinders. Consequently, substantially all of the vibration forces are changed into shear stress which acts on the connecting surfaces between the surge tank with the throttle body. Accordingly, problems may be experienced with the sealing between the throttle body and the surge tank. Also, movement of the throttle valves may become stiff.

SUMMARY OF THE INVENTION

In view of the foregoing difficulties, the primary object of the present invention is to provide an intake apparatus in which vibration durability is increased. In order to achieve the object of the present invention, the throttle body is connected to the surge tank in such a manner that vibration forces generated by the throttle body, which occur in a plane parallel to the cylinder axes, are partly changed into compressive stress on the connecting surfaces of the surge tank and throttle body, thereby effectively suppressing to a marked degree the effect of vibration of the throttle body as well as the amount of vibration itself.

In accordance with the present invention, an intake apparatus is provided for an in-line internal combustion engine having an intake passage for supplying intake air to the in-line engine cylinders, a surge tank in the intake passage, a throttle body secured to a side surface of the surge tank through registering connecting surfaces which are provided on each of the surge tank and the throttle body. The connecting or mating surfaces are arranged in a plane inclined with respect to the cylinder axes. In the arrangement of the present invention, vibration forces imposed on the throttle body, which occur in a plane parallel to the cylinder axes, are effectively suppressed because of the inclination of the registering connecting surfaces with respect to the cylinder axes. Hence, vibration durability of the intake apparatus is greatly increased.

DESCRIPTION OF THE PREFERRED EMBODIMENT

Figure 1:
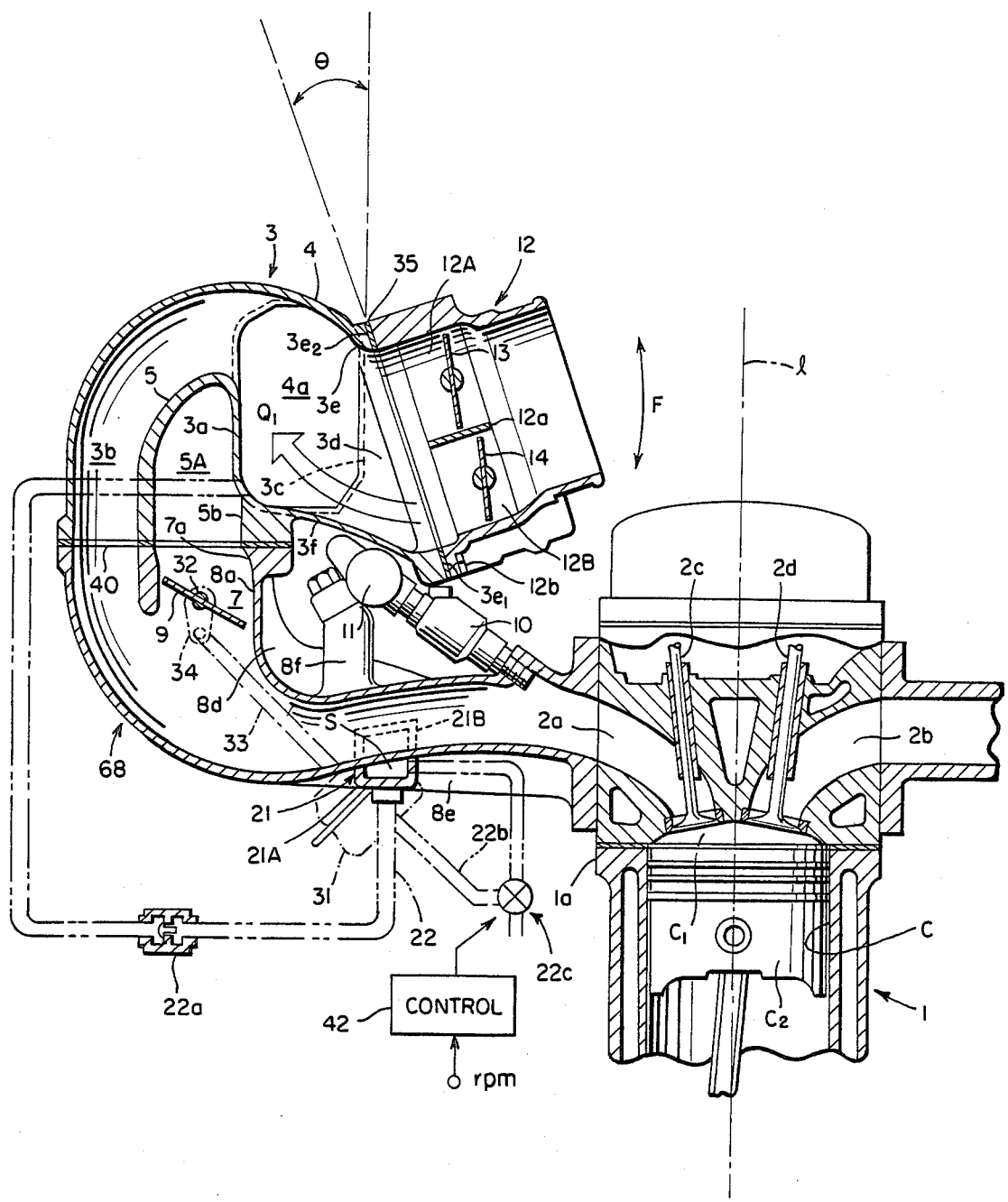
FIG. 1 is a cross-sectional view, taken partly along lines I—I in FIG. 2, showing an embodiment of the present invention.

Referring now to FIG. 1, reference numeral 1 denotes an engine body of an in-line four-cylinder engine. This engine body 1 has first to fourth cylinders C (only one of them is shown in FIG. 1). To a combustion chamber C1 formed in each cylinder C are connected an intake port 2a and an exhaust port 2b, respectively, by way of an intake valve 2c and an exhaust valve 2d. Reference numeral C2 denotes the piston operating in the cylinder C.

A surge tank 3 is disposed upstream of the four intake passages which are connected to one side 1a of the engine body 1. The surge tank 3 extends longitudinally and is arranged in the direction of the cylinder row (perpendicular to the paper in FIG. 1). The surge tank 3 has a first surge tank 4 and a second surge tank 5 which are integrally formed with each other. The inside of the surge tank 3 is divided into two parts by a partition wall 3a, that is, a first chamber 4A and a second chamber 5A are respectively formed for the first surge tank 4 and the second surge tank 5. The partition wall 3a extends and is elongated in the direction of the cylinder row. The first surge tank 4 is provided nearer the one side 1a of the engine body 1 and a little higher than the second surge tank 5.

The first surge tank 4 is communicated with intake ports 2a by way of first intake passages 6. The first intake passages 6 emanate from surge tank 4 and are provided independent of each other. The second surge tank 5 communicates with the first intake passages 6 at a midpoint by way of second independent intake passages 7. The first intake passages 6 are designed to be longer than the second intake passages 7. Upstream portions 3b of the first intake passages 6 are integrally formed with the surge tank 3, and the rest of passages 6 are formed as separate intake pipes 8 which through a common header connect the upstream portions 3b with the intake ports 2a. The first intake passages 6 are also designed to extend initally in the diretion away from the one side 1a of the engine body 1 and are then curved or looped downwardly below the surge tank 3 in a U-shaped manner and turned toward the intake ports 2a. In this fashion, the first intake passages 6 can obtain sufficient length.

The second intake passages 7 are formed by bifurcating pipes 8 to form bifurcated branch pipes 8a. Upper ends 7a of the second intake passages 7 are connected, e.g., by conventional bolts, to the lower ends 5b of the second surge tank 5 at the joint indicated at 40. Therefore, it can be understood that the second surge tank 5 (the second chamber 5A) and the bifurcated pipes 8a are formed by utilizing dead space existing between the first surge tank 4 and the upstream portions 3b of intake passages 6.

Shutter valves 9 are provided in the bifurcated pipes 8a for changing the effective intake air path. The shutter valves 9 are moved between a closed position and an open position according to the engine rpm controlled by an actuator as will be described hereinafter. Essentially, the shutters are closed when the engine rpm is lower than a preset value and are opened when the engine rpm is above the preset value. Numeral 10 denotes a fuel injection valve and numeral 11 denotes an associated delivery pipe. They are supported by bosses 8 formed on the intake pipes 8.

A two-bore throttle body 12 is connected to the side of the first surge tank 4 via registering and matching surfaces and four bolts 12b. Intake air is principally supplied to the first surge tank 4 through the two-bore throttle body 12. The two-bore throttle body 12 has, as is well known, a primary passage 12A and a secondary passage 12B which are divided by a partition wall 12a. Throttle valves 13 and 14 are respectively disposed in the primary passage 12A and the secondary passage 12B. Throttle valves 13 and 14 are opened according to a driver's operation of the acceleration pedal (not shown). Normally, only the throttle valve 13 is opened when the engine load is lower than the preset value. The throttle valve 14 begins to open while the throttle valve 13 is kept in the open position when the engine load becomes greater than the preset value.

Figure 4:
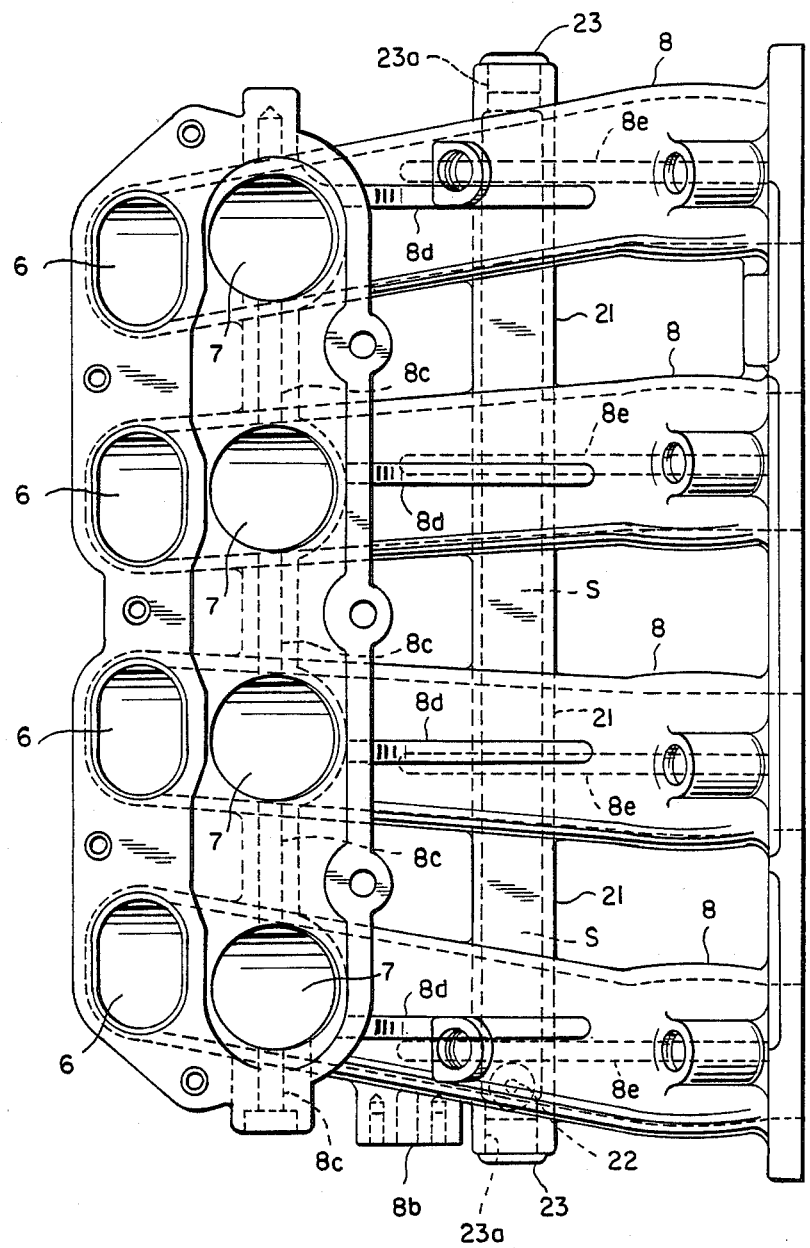
FIG. 4 is a plan view of discrete intake passages with the surge tank removed.

The intake pipes 8 are, as shown in FIG. 4, connected with each other by a box-like hollow reinforcement 21 elongating in the direction of the cylinder row. The reinforcement 21 has a substantially rectangular cross-sectional inner space, which functions as a vacuum chamber S. The vacuum chamber S is communicated to the first surge tank 4 (the first chamber 4A) by way of a pipe 22. A check valve 22a is provided in the passage of the pipe 22 to avoid the leakage of vacuum from the vacuum chamber S to the first surge tank 4. Therefore, the vacuum generated in the first surge tank 4 during engine operation can be stored in the vacuum chamber S.

The reinforcement 21, which is integrally formed with the intake pipes 8 by casting, has end openings 23a for discharging a ram-up core of the vacuum chamber S. Closing plugs 23 are inserted in the end openings 23a. (See FIG. 4.) The vacuum chamber S is formed long and continuous in the direction of the cylinder row, and the reinforcement 21 has a lower half 21A locating below the intake pipes 8 and an upper half 21B connected with the sidewalls of the intake pipes 8.

Opening and closing of the shutter valves 9 are controlled by a diaphragm type actuator 31. The actuator 31 is fixed on the side surface 8b of the first intake pipe 8. A valve shaft 32 is rotatably held in the intake pipes 8 by bearings 8c. Shaft 32 extends for the length of the cylinder row. The shutter valves 9 are fixed to and carried by the valve shaft 32. A link 34 connects the valve shaft 32 to actuating or drive rod 33 of the actuator 31. The actuator 31 communicates with the vacuum chamber S by way of pipe 22b. An electromagnetic on-off valve 22c is provided in the passage of the pipe 22b. The electromagnetic on-off valve 22c controls vacuum supply from vacuum chamber S to the actuator 31. The vacuum supply is controlled as indicated at 42 according to the engine rpm.

With the arrangement described above, the shutter valves 9 are closed when the engine rpm is lower than the preset value. Therefore, intake air is conducted only from the first surge tank 4 to the intake ports 2a by way of the first intake passages 6 and the effective length of the intake passage is relatively long and the appropriate inertia effect of intake air can be obtained in the engine low speed range. On the other hand, the shutter valves 9 are opened when the engine rpm is above the preset value. Therefore, intake passages 7 from the second surge tank 5 are exposed to the first intake passages 6, and the effective length of the intake passage becomes relatively short and the appropriate inertia effect of intake air can be obtained in the engine high speed range.

Figure 2:
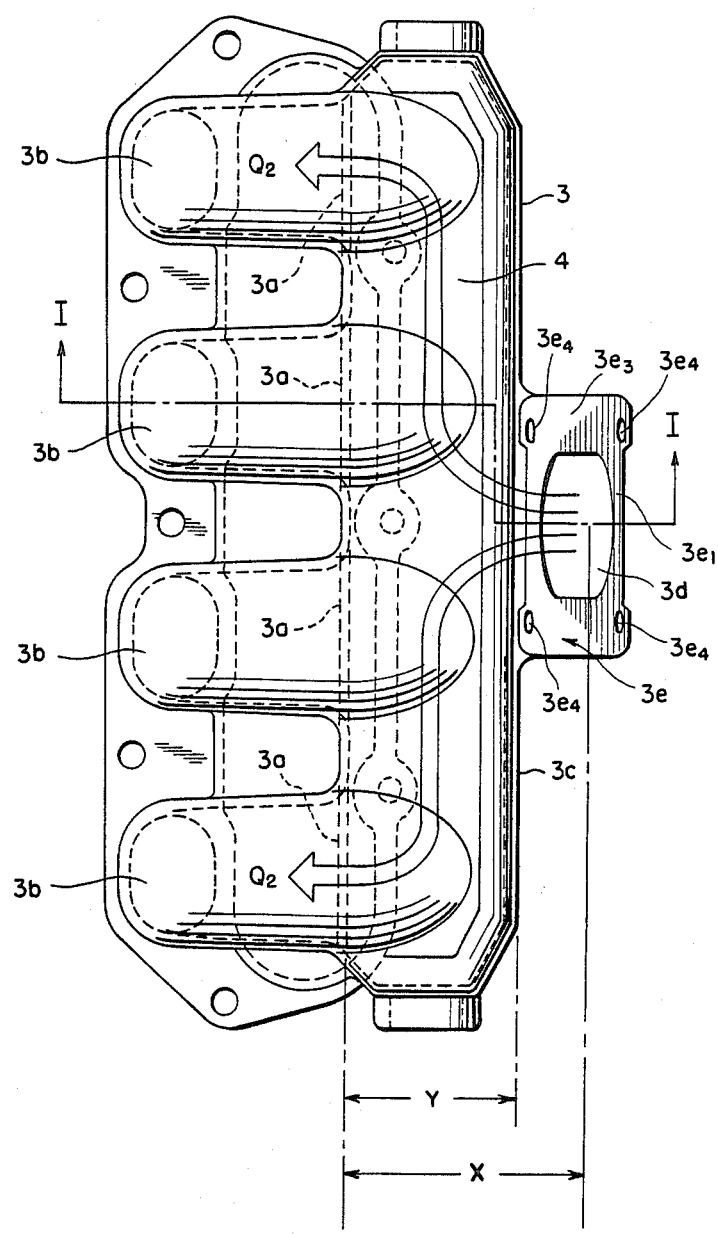
FIG. 2 is a plan view of a surge tank.
Figure 3:
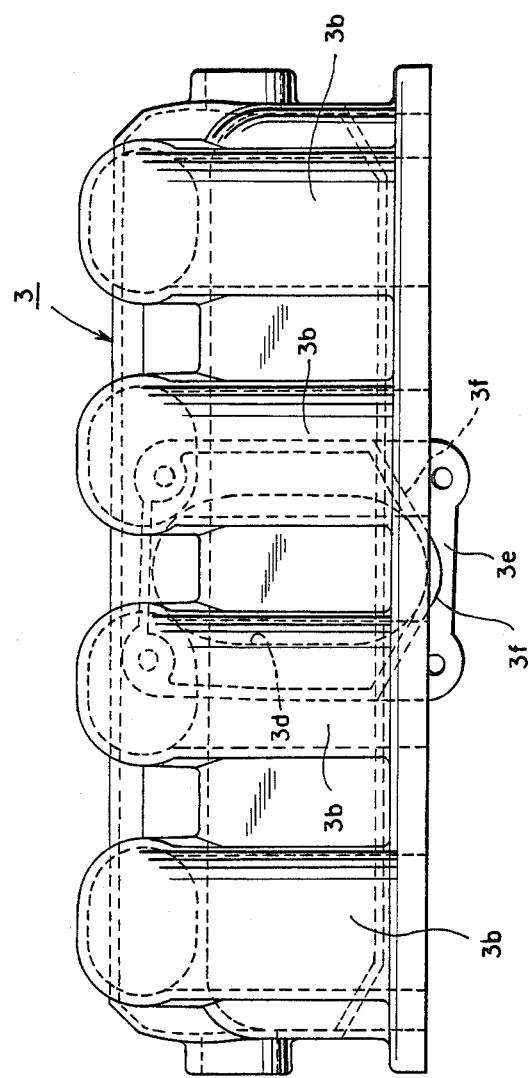
FIG. 3 is an elevational view of a surge tank shown from the left-hand side in FIG. 2.

The installation of the throttle body 12 on the surge tank 3 will now be described. The surge tank 3 has an inlet opening 3d provided on its side surface 3c which faces the engine body 1. The inlet opening 3d is comprised of a flange 3e for connecting to the throttle body 12. This flange 3e presents a flange surface $3e_3$ provided with four bolt holes $3e_4$. Flange surface $3e_3$ is inclined with respect to the inline cylinder medial vertical plane or axis L by $\theta$ degrees as shown in FIG. 1. Thus, lower end $3e_1$ of the flange 3e is nearer to the cylinder axis 1 than the upper end $3e_2$ of the flange 3e. Further, the upper end $3e_2$ is connected to the upper corner of the first surge tank 4, but the lower edge or end $3e_1$ is displaced outwardly from the lower corner of the first surge tank 4 through an elongated bottom portion 3f. The elongated bottom portion 3f is designed to elongate gradually downward in the direction away from the first surge tank 4, and to merge with the throttle body 12 which is longitudinally long of necessity to accommodate the arrangement of throttle valves 13 and 14. Furthermore, the elongated bottom portion 3f has an inner V-shaped bottom surface 3f, as shown in FIG. 3, with the Vee lying in the axial direction of the inlet opening 3d. The elongated bottom surface 3f smoothly guides intake air from the lower secondary passage 12B to the first surge tank 4 up the slope of the inner bottom surface 3f along the Vee. (See arrow $Q_1$ in FIG. 1.) The elongated bottom surface 3f also reduces the resistance of intake airflow from the secondary passage 12B to the end cylinder (see arrows $Q_2$ in FIG. 2) due to the tilt or inclination of the flange 3e. The inclination of the flange 3e increases distance X between the outlet of the secondary passage 12B and the inner wall 3a of the surge tank 4. The distance X is longer than the distance Y of conventional engines. Accordingly, the degree of curvature of intake airflow $Q_1$ and $Q_2$ can be better moderated than previously known or possible in the art. Further, the resistance to intake airflow from the secondary passage 12B is reduced. Because the secondary passage 12B supplies a great amount of intake air under high engine load, the reduction in resistance to intake airflow from the secondary passage 12B makes it possible to obtain higher power.

With the engine in operation, a vibration force F (see FIG. 1) is generated on the throttle body 12 in a plane parallel to the in-line cylinder medial plane or axis 1. However, the connection between surge tank 3 and throttle body 12 can effectively suppress the vibration force F, because the vibration is translated into a newly generated compressive stress component (i.e., F·sin $\theta$) and a residual shear stress component (i.e., F·cos $\theta$). Consequently, the overall stress on the flange 3e is reduced due to the inclination of flange 3e. Increase of compressive stress and decrease of shear stress leads directly to preventing the seal or gasket 35 interposed between the registering faces of flange 3e and body 12 from failing or being adversely or deleteriously affected. Throttle valves 13 and 14 are kept operating smoothly without any stiffness.

In this embodiment, the inlet opening 3d is designed to overlap each of upper and lower corners of the surge tank 3 so that the strength of the surge tank 3 can be enhanced. The increase of strength of the surge tank 3 is useful to reduce the vibration of the throttle body 12 and vice versa. Furthermore, ribs 8d and 8e are formed upside and downside of the first intake passages 6, respectively. A pair of ribs 8d and 8e are disposed to overlap each other when they are seen from the top. (See FIG. 4.) These ribs 8d and 8e can enhance the strength of the first intake passages 6. This increase in strength leads to reducing the vibration of the throttle body 12, because the compressive stress (ie., $F \sin \theta$) imposed on the flange 3e is more readily absorbed.

It is to be understood that the foregoing description of a preferred embodiment of the present invention is given by way of example and not limitation. Various other embodiments and variants are possible within the spirit and scope of the invention.

We claim:

1. An intake apparatus for an internal combustion engine comprising:
   (a) an internal combustion engine having a plurality of in-line cylinders,
   (b) intake passage means for supplying intake air to the engine cylinders including a surge tank having a side surface with an opening defined therein,
   (c) throttle body means having an end surface defining an exit therein,
   (d) connecting means for connecting said end surface and said side surface with said exit and said opening in communication and with the joint between said surfaces inclined with respect to the cylinders' axes,
   (e) said throttle body means being connected to both upper and lower corners of said surge tank, the lower end of said throttle body means being connected to the lower corner of said surge tank through an elongated bottom portion formed at the bottom of said surge tank, said elongated bottom portion having an inner V-shaped bottom surface.

2. An intake apparatus for an internal combustion engine comprising:
   (a) an internal combustion engine having a plurality of in-line cylinders,
   (b) intake passage means for supplying intake air to the engine cylinders including a surge tank having a side surface with an opening defined therein,
   (c) throttle body means having an end surface defining an exit therein,
   (d) connecting means for connecting said end surface and said side surface with said exit and said opening in communication and with the joint between said surfaces inclined with respect to the cylinders' axes,
   (e) said throttle body means being connected to both upper and lower corners of said surge tank, the lower end of said throttle body means being connected to the lower corner of said surge tank through an elongated bottom portion formed at the bottom of said surge tank, said throttle body means being a two-bore throttle body having a primary passage and a secondary passage, and said secondary passage being arranged lower than said primary passage.

3. An intake apparatus for an internal combustion engine comprising:
   (a) an internal combustion engine having a plurality of in-line cylinders,
   (b) intake passage means for supplying intake air to the engine cylinders including a surge tank having a side surface with an opening defined therein,
   (c) throttle body means having an end surface defining an exit therein,
   (d) connecting means for connecting said end surface and said side surface with said exit and said opening in communication and with the joint between said surfaces inclined with respect to the cylinders' axes, said connected end and side surfaces being inclined with respect to the cylinders' axes in such a manner that the weight of said throttle body means imposes a compressive stress on said side surface of said surge tank.

4. An intake apparatus as defined in claim 3 in which said intake passage means defines an intake passage which connects said surge tank with intake ports formed in engine cylinders, said surge tank being located above the engine cylinders, said intake passage extending from the surge tank in a direction away from the engine cylinders and then is curved downwardly below the surge tank in a U-shaped manner toward the intake ports.

5. An intake apparatus as defined in claim 4 in which said connected end and side surfaces are inclined with respect to the cylinders' axes in such a manner that the lower end thereof is nearer to the cylinders' axes than the upper end thereof.

6. An intake apparatus as defined in claim 3 in which said surge tank extends longitudinally approximately the extension of the engine and said throttle body means is connected to a central portion of said surge tank.

7. An intake apparatus as defined in claim 3 in which said throttle body means is connected to both upper and lower corners of said surge tank.

8. An intake apparatus as defined in claim 7 in which said throttle body means is a two-bore throttle body arranged in a longitudinal direction having a primary passage and a secondary passage.

9. An intake apparatus as defined in claim 7 in which the lower end of said throttle body means is connected to the lower corner of said surge tank through an elongated bottom portion formed at the bottom of said surge tank.

10. An intake apparatus as defined in claim 9 in which said elongated bottom portion has an inner V-shaped bottom surface.

11. An intake apparatus as defined in claim 9 in which said throttle body means is a two-bore throttle body having a primary passage and a secondary passage, and said secondary passage is arranged lower than said primary passage.

* * * * *